United States Patent
Fujishiro

(10) Patent No.: US 12,213,200 B2
(45) Date of Patent: Jan. 28, 2025

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 490 days.

(21) Appl. No.: 17/509,275

(22) Filed: Oct. 25, 2021

(65) Prior Publication Data
US 2022/0046741 A1 Feb. 10, 2022

Related U.S. Application Data

(63) Continuation of application No. PCT/JP2020/017528, filed on Apr. 23, 2020.

(30) Foreign Application Priority Data

Apr. 26, 2019 (JP) .................................. 2019-086500

(51) Int. Cl.
*H04W 76/19* (2018.01)
*H04B 17/309* (2015.01)
(Continued)

(52) U.S. Cl.
CPC .......... *H04W 76/19* (2018.02); *H04B 17/309* (2015.01); *H04W 24/10* (2013.01); *H04W 76/15* (2018.02); *H04W 76/28* (2018.02)

(58) Field of Classification Search
CPC ..... H04W 76/15; H04W 76/19; H04W 76/28; H04W 24/10; H04B 17/24; H04B 17/309
See application file for complete search history.

(56) References Cited

U.S. PATENT DOCUMENTS 10,314,030 B2 * 6/2019 Kim ................... H04W 24/10
11,877,332 B2 * 1/2024 Yilmaz ................ H04W 24/10
(Continued)

FOREIGN PATENT DOCUMENTS

CN 110536429 B * 4/2023 .......... H04W 72/046
CN 110754106 B * 4/2024 ............ H04W 24/08
(Continued)

OTHER PUBLICATIONS

Oppo, "Fast MCG recovery for MR-DC enhancement", 3GPP TSG-RAN2 #105bis, R2-1903088, Apr. 8-12, 2019, pp. 1-4, Xian, China.

*Primary Examiner* — Chi H Pham
*Assistant Examiner* — Vladislav Y Agureyev
(74) *Attorney, Agent, or Firm* — Studebaker & Brackett PC

(57) ABSTRACT

A communication control method according to an embodiment is a method for controlling dual connectivity communication in which a user equipment simultaneously communicates with a master node and a secondary node. The communication control method includes detecting, by the user equipment, degradation of a radio link between the master node and the user equipment, starting, by the user equipment, a timer in response to detecting degradation of the radio link, the timer being for waiting for an indication from the master node, and transmitting, by the user equipment, a message indicating the degradation of the radio link, to the secondary node in response to the detecting of the degradation of the radio link, the message being transferred from the secondary node to the master node. The message includes timing information indicating a start timing for the timer.

7 Claims, 13 Drawing Sheets

(51) Int. Cl.
*H04W 24/10* (2009.01)
*H04W 76/15* (2018.01)
*H04W 76/28* (2018.01)

(56) References Cited

U.S. PATENT DOCUMENTS

| | | | |
|---|---|---|---|
| 2015/0133122 A1 | 5/2015 | Chen | |
| 2016/0128134 A1* | 5/2016 | Yiu | H04W 40/22 |
| | | | 455/441 |
| 2017/0195996 A1* | 7/2017 | Fujishiro | H04W 24/02 |
| 2017/0331670 A1* | 11/2017 | Parkvall | H04B 7/0617 |
| 2017/0374705 A1* | 12/2017 | Mitsui | H04W 72/21 |
| 2018/0367288 A1* | 12/2018 | Vrzic | H04W 36/22 |
| 2019/0021126 A1 | 1/2019 | Chun et al. | |
| 2019/0045568 A1* | 2/2019 | Palat | H04W 76/27 |
| 2019/0141592 A1* | 5/2019 | Park | H04B 7/0695 |
| 2019/0380075 A1* | 12/2019 | Ugurlu | H04W 36/06 |
| 2020/0145091 A1* | 5/2020 | Luo | H04W 72/046 |
| 2020/0314955 A1* | 10/2020 | Velev | H04W 24/02 |
| 2020/0314960 A1* | 10/2020 | Basu Mallick | H04W 76/27 |
| 2020/0329437 A1* | 10/2020 | MolavianJazi | H04W 52/346 |
| 2020/0336872 A1* | 10/2020 | Basu Mallick | H04W 4/40 |
| 2020/0344019 A1* | 10/2020 | Da Silva | H04W 24/04 |
| 2020/0351968 A1* | 11/2020 | Yilmaz | H04W 36/0058 |
| 2021/0329468 A1* | 10/2021 | Babaei | H04W 74/0833 |
| 2021/0352753 A1* | 11/2021 | Zhang | H04W 40/34 |
| 2022/0104301 A1* | 3/2022 | Wu | H04W 76/16 |
| 2022/0131793 A1* | 4/2022 | Ramachandra | H04W 36/305 |
| 2022/0210681 A1* | 6/2022 | Thangarasa | H04W 24/10 |

FOREIGN PATENT DOCUMENTS

| | | | | |
|---|---|---|---|---|
| EP | 4013122 A1 * | 6/2022 | | H04B 17/309 |
| JP | 2015-122735 A | 7/2015 | | |
| JP | 2019-506064 A | 2/2019 | | |
| WO | WO-2015115573 A1 * | 8/2015 | | H04W 24/10 |
| WO | WO-2018143415 A1 * | 8/2018 | | H04W 68/00 |
| WO | WO-2019038700 A1 * | 2/2019 | | H04L 41/0654 |
| WO | WO-2019067970 A1 * | 4/2019 | | H04L 1/08 |

* cited by examiner

COMMUNICATION CONTROL METHOD

RELATED APPLICATIONS

The present application is a continuation based on PCT Application No. PCT/JP2020/017528, filed on Apr. 23, 2020, which claims the benefit of Japanese Patent Application No. 2019-086500 filed on Apr. 26, 2019. The content of which is incorporated by reference herein in their entirety.

TECHNICAL FIELD

The present disclosure relates to a communication control method in mobile communication systems.

BACKGROUND ART

The 3rd Generation Partnership Project (3GPP), a standardization project for mobile communication systems, has defined dual connectivity that allows a user equipment to communicate simultaneously with a master node and a secondary node. In dual connectivity, radio resources are allocated to the user equipment from both the master node and the secondary node, thus allowing the user equipment to use high speed and highly reliable communication.

During communication in such dual connectivity, in a case where the user equipment detects degradation of a radio link with the master node, for example, a Radio Link Failure (RLF), the dual connectivity communication is terminated, and the user equipment may re-establish an RRC connection with another base station. However, a radio state between the user equipment and the master node may improve after such degradation of the radio link, and it is desirable to introduce a mechanism that allows the dual connectivity communication to be quickly recovered.

SUMMARY

A communication control method according to a first embodiment is a method for controlling dual connectivity communication in which a user equipment simultaneously communicates with a master node and a secondary node. The communication control method includes: detecting, by the user equipment, degradation of a radio link between the master node and the user equipment; starting, by the user equipment, a timer in response to the detecting of the degradation of the radio link; transmitting, by the user equipment, a message indicating the degradation of the radio link, to the secondary node in response to the detecting of the degradation of the radio link; and performing, by the user equipment, processing for establishing an RRC connection in a case that the timer is expired.

DESCRIPTION OF EMBODIMENTS

Figure 1:
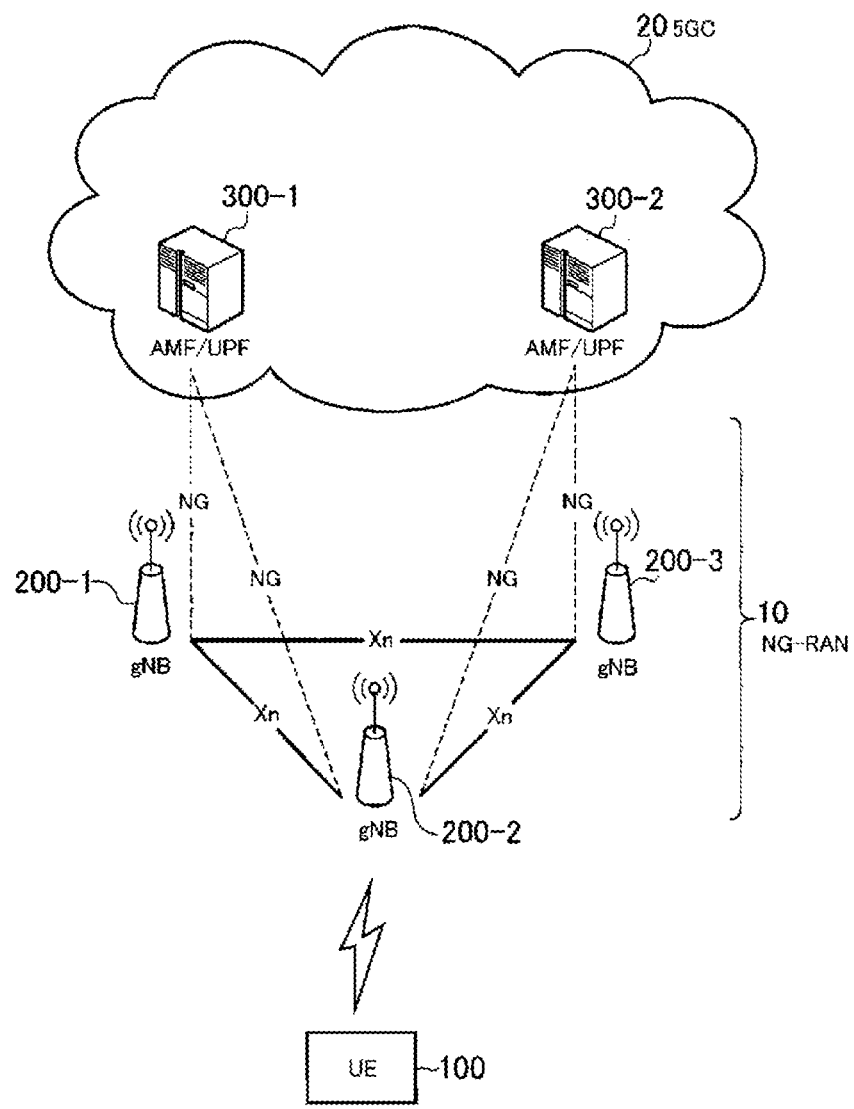
FIG. 1 is a diagram illustrating a configuration of a mobile communication system according to an embodiment.

A mobile communication system according to an embodiment will be described with reference to the drawings. In the description of the drawings, the same or similar parts are given the same or similar reference numerals.

Mobile Communication System

First, a configuration of a mobile communication system according to an embodiment will be described. Although the mobile communication system according to the embodiment is a 5G system of the 3GPP, LTE may be at least partially applied to the mobile communication system.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
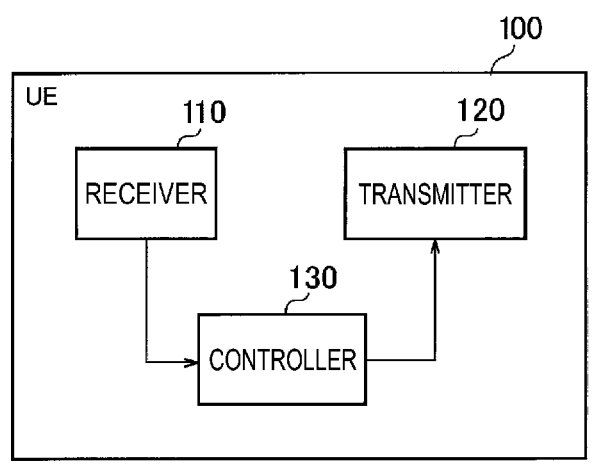
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

Figure 3:
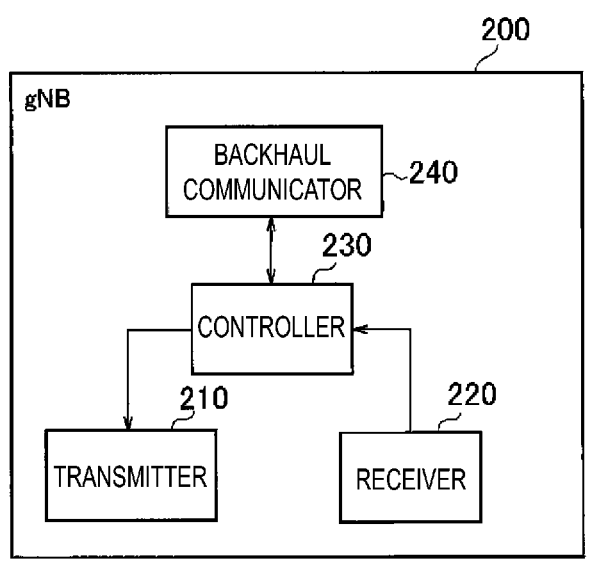
FIG. 3 is a diagram illustrating a configuration of a base station according to the embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
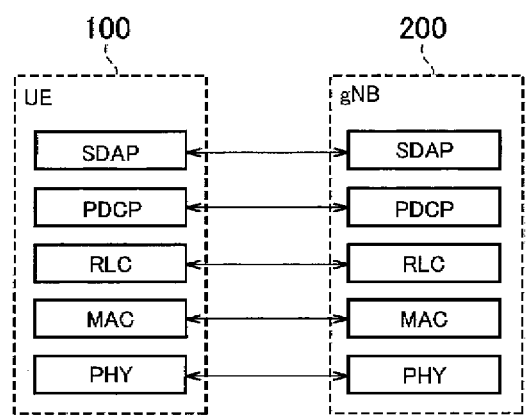
FIG. 4 is a diagram illustrating a configuration of a radio interface protocol stack in a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
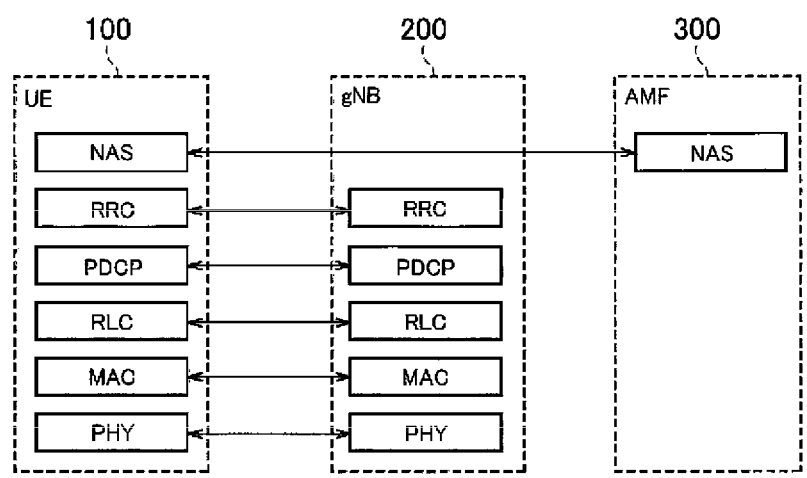
FIG. 5 is a diagram illustrating a configuration of a radio interface protocol stack in a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. In a case where there is a connection (RRC connection) between the RRC of the UE 100 and the RRC of the gNB 200, the UE 100 is in an RRC connected mode. In a case where there is no connection (RRC connection) between the RRC of the UE 100 and the RRC of the gNB 200, the UE 100 is in an RRC idle mode. In a case where the RRC connection is suspended, the UE 100 is in an RRC inactive mode.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Dual Connectivity

Figure 6:
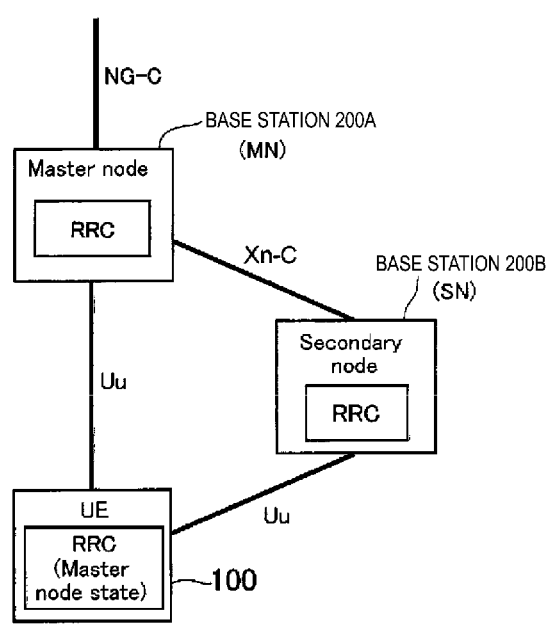
FIG. 6 is a diagram illustrating dual connectivity (DC) according to an embodiment.

Next, a summary of dual connectivity (DC) will be described. In the following, DC including NR access is mainly assumed. Such DC may be referred to as Multi-RAT DC (MR-DC) or Multi-connectivity. FIG. 6 is a diagram illustrating an example of DC.

As illustrated in FIG. 6, in DC, the UE 100 including a plurality of transceivers is configured to utilize resources provided by two different nodes (two different base stations). One base station provides NR access and the other base station provides E-UTRA (LTE) or NR access. In the example illustrated in FIG. 6, a base station 200A may be an eNB or a gNB, and a base station 200B may be an eNB or a gNB.

One base station 200A functions as a master node (MN), and the other base station 200B functions as a secondary node (SN). The MN is a radio access node that provides control plane connection to the core network. The MN may be referred to as a master base station. The SN is a radio access node that does not have control plane connection to the core network. The SN may be referred to as a secondary base station.

The MN and the SN are connected via a network interface (inter-base station interface), and at least the MN is connected to the core network. FIG. 6 illustrates an example in which the inter-base station interface is an Xn interface; however, the inter-base station interface may be an X2 interface. The MN and the SN transmit and/or receive various messages described later via the inter-base station interface.

A group of serving cells that are cells of the MN and are configured for the UE 100 is referred to as a master cell group (MCG). On the other hand, a group of serving cells that are cells of the SN and are configured for the UE 100 is referred to as a secondary cell group (SCG).

According to DC, radio resources are allocated to the UE 100 from both the MN (MCG) and the SN (SCG) and the UE 100 simultaneously communicates with the MN and the SN, and thus, high speed and highly reliable communication can be made available to the UE 100.

The UE 100 may have a single RRC state based on the RRC of the MN and a single control plane connection to the core network. Each of the MN and SN includes an RRC entity capable of generating an RRC Protocol Data Unit (RRC PDU) to be transmitted to the UE 100.

First Embodiment

Next, operations of the mobile communication system according to the first embodiment will be described assuming the configuration of the mobile communication system as described above.

In the first embodiment, it is assumed that after initiation of DC communication, degradation of a radio link (hereinafter referred to as an "MCG link") between the base station 200A and the UE 100 is detected. In this case, an example will be described in which the base station 200A functioning as the MN can quickly restore the DC communication by controlling the UE 100 via the base station 200B functioning as the SN.

Figure 7:
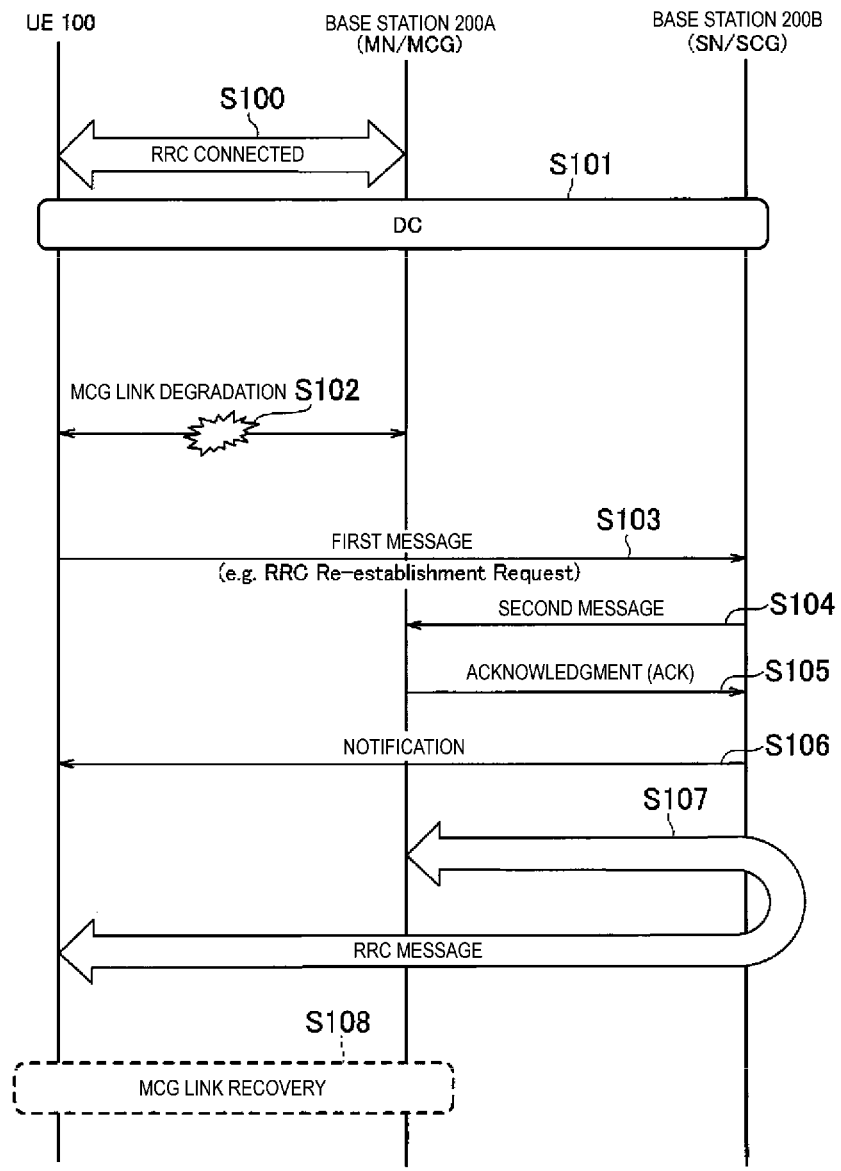
FIG. 7 is a diagram illustrating operations of a mobile communication system according to a first embodiment.

FIG. 7 is a diagram illustrating operations of a mobile communication system according to the first embodiment.

As illustrated in FIG. 7, in step S100, the UE 100 establishes an RRC connection with the base station 200A and is in the RRC connected mode.

In step S101, the UE 100 initiates the DC communication with the base station 200A and the base station 200B.

Here, the base station 200A may transmit to the base station 200B an Addition Request for requesting the addition of the base station 200B for DC. The base station 200B may transmit a positive acknowledgment (Addition Request Ack) for the Addition Request to the base station 200A in response to receiving the Addition Request. The base station 200A may transmit an RRC message (for example, an RRC Reconfiguration message) including DC configuration information to the UE 100 in response to receiving a positive acknowledgment (Addition Request Ack).

The base station 200A may configure this operation for the UE 100 having the function of performing the operation according to the first embodiment (the MCG maintaining function via the SCG) as part of the DC configuration.

The base station 200A may configure a threshold value for detecting degradation of the MCG link for the UE 100. The threshold value may be different from a threshold value for defining a triggering condition for a measurement report. The threshold value may be a threshold value concerning a radio state for detecting a sign of an RLF. For example, the base station 200A configures the number of times N as a threshold value for the UE 100 under the assumption that the UE 100 detects an RLF when the number of RLC retransmissions reaches M (M>N). This allows the UE 100 to detect a likelihood of an RLF at an early stage before an RLF with the MCG occurs.

As a result, the base station 200A functions as the MN, and the base station 200B functions as the SN. At least one cell of the base station 200A is configured as an MCG for the UE 100, and at least one cell of the base station 200B is configured as an SCG for the UE 100.

In step S102, the UE 100 detects degradation of the MCG link. The radio link refers to a radio connection that is in or lower than the layer 2.

Degradation of the MCG link refers to an occurrence of an RLF or an occurrence of a sign of the RLF. For example, the UE 100 detects an RLF in a case where a radio problem (e.g., out-of-synchronization) occurs in the physical layer and no recovery is made within a certain period of time, or in a case where random access procedure failure and/or RLC layer failure occurs.

A sign of an RLF means that the detection threshold value of an RLF is not met, but a failure below the detection threshold value of an RLF has occurred. For example, a sign of an RLF corresponds to a prescribed number of times of occurrence of the out-of-synchronization within a certain period of time in the MCG link, or a prescribed number of times of retransmission of a random access preamble in the random access procedure. These prescribed number of times may be configured as threshold values from the base station 200A.

Note that, in a case where an RLF or a sign of the RLF between the base station 200A and the UE 100 occurs, it is conceivable that the UE 100 can detect the RLF or the sign of the RLF, but the base station 200A is not capable of detecting the RLF or the sign of the RLF.

In step S103, the UE 100 transmits a first message based on degradation of the MCG link to the base station 200B functioning as the SN. Specifically, when the UE 100 detects an RLF with the base station 200A functioning as the MN or a sign of the RLF, the UE 100 reselects, on a priority basis, the base station 200B (SCG) functioning as the SN. Then, the UE 100 transmits an RRC Re-establishment Request message (first message) for requesting re-establishment of the RRC connection to the base station 200B (SCG). Alternatively, the first message may be an RRC Resume Request message for requesting recovery of the RRC connection. Alternatively, the first message may be a message indicating a connection status of the MCG link, or a measurement report message. The first message may be the same as a first message according to a second embodiment described later. The UE 100 may include in the first message a matter that the UE 100 has a function of performing the operation according to the first embodiment (the MCG maintaining function via SCG), or a matter that the UE 100 wants to perform the operation.

In a case where the first message is a message indicating the connection status of the MCG link, the UE 100 that detects a sign of an RLF may transmit the first message not only to the base station 200B, but also to the base station 200A.

In a case where the first message is an RRC Re-establishment Request message or an RRC Resume Request message, an RRC connection may be established between the UE 100 and the base station 200B based on the first message.

Here, the UE 100, when transmitting the RRC Re-establishment Request message, may omit the transmission of the random access preamble (Msg1) to the base station 200B and the reception of the random access response (Msg2) from the base station 200B. The UE 100 may include in the RRC Re-establishment Request message a Cell-Radio Network Temporary Identifier (C-RNTI) used in the SCG during DC. Specifically, the C-RNTI is assigned to the UE 100 from each of the base station 200A and the base station 200B, and the UE 100 includes the C-RNTI assigned from the base station 200B in the RRC Re-establishment Request message. The base station 200B identifies, based on the C-RNTI included in the RRC Re-establishment Request message received from the UE 100, that the UE being a transmission source of the RRC Re-establishment Request message is the UE 100 to which the base station 200B (SN) has provided the SCG. The UE 100 may include in the RRC Re-establishment Request message a cell identifier of a primary secondary cell (PSCell) included in the SCG provided by the base station 200B (SN), in place of or in addition to the C-RNTI assigned from the base station 200B. The base station 200B may determine that the UE 100 having transmitted the RRC Re-establishment Request message including the C-RNTI assigned by the base station 200B and/or the cell identifier of the PSCell has the capability of an MCG link maintaining function via the SCG.

In step S104, the base station 200B that received the first message transmits a second message to the base station 200A, the second message being used to recover the DC communication.

The second message may be a request message requesting the base station 200A to maintain an RRC connection between the base station 200A and the UE 100 or maintain a DC state. The second message may be a notification message notifying the base station 200A that the base station 200B has received from the UE 100 the RRC Re-establishment Request message from the UE 100. The second message may be a transfer message including the RRC Re-establishment Request message, as a container, that the base station 200B has received from the UE 100. The second message may be the same as a second message according to the second embodiment described later.

The second message includes, as information elements, the respective identifiers of the MN (base station 200A) and the SN (base station 200B) on the inter-base station interface, and a UE identifier on the inter-base station interface. In the first embodiment and the second embodiment below, the message transmitted and/or received between the base station 200A and the base station 200B includes these information elements.

The second message may be a message requesting or suggesting a split SRB or a message including an information element requesting or suggesting the split SRB. The split SRB is split in the MN to transmit the SRB not only in the MCG but also in the SCG. The second message may notify the type of SRB (SRB1, SRB2, or both) acceptable as a split SRB.

In step S105, the base station 200A that received the second message transmits a response message for the second message to the base station 200B.

The response message may be a positive acknowledgment (Ack) to acknowledge maintaining the RRC connection between base stations 200A and the UE 100 or maintaining the DC state.

The response message may be a negative acknowledgment (Nack) to reject maintaining the RRC connection between the base station 200A and the UE 100 or maintaining the DC state. In this case, the base station 200A may transmit to the base station 200B a Handover Request message for handing over the UE 100 to the base station 200B.

The response message may include information indicating which SRB is to be a split SRB (Requested Split SRBs).

The base station 200B that received the negative acknowledgment (Nack) from the base station 200A may transmit the RRC Re-establishment message to the UE 100 in response to the RRC Re-establishment Request message received from the UE 100. Alternatively, in a case where the UE 100 does not detect an RLF with the base station 200A, the base station 200B that has received a negative acknowledgment (Nack) from the base station 200A may transmit, to the UE 100, a message or information element that prompts the UE 100 to detect an RLF. The base station 200B may cause the UE 100 to perform the Re-establishment. The message prompting the UE 100 to detect an RLF may be an RRC Re-establishment Reject message. In a case where the UE 100 has received a message prompting the UE 100 to detect an RLF, the UE 100 continues to communicate with the base station 200A (MCG), and monitors for an RLF.

In the following, the description proceeds under the assumption that the response message received by the base station 200B is a positive acknowledgment (Ack).

In step S106, the base station 200B that received a positive acknowledgment (Ack) transmits to the UE 100 a message notifying that the RRC connection with the base station 200A is maintained via the base station 200B (SCG link). In this state, the RRC connection between the UE 100 and the base station 200A is not physically via the MCG managed by the base station 200A. As such, the UE 100 may stop monitoring for an RLF for the base station 200A (MCG) and other procedures (e.g., PUCCH transmission, DRX operation, and the like). However, the UE 100 performs measurement of the radio state for the base station 200A.

In step S107, an RRC message is transmitted and/or received between the UE 100 and the base station 200A via the base station 200B while maintaining the RRC connection between the UE 100 and the base station 200A. The RRC message refers to a message transmitted and/or received in the RRC layer.

Here, the RRC message from the base station 200A to the UE 100 is transferred via the inter-base station interface to the base station 200B, and, thereafter, transmitted in an RRC container transmitted on a signaling radio bearer (SRB) 3 from the base station 200B to the UE 100. The SRB 3 refers to a radio bearer for control established between the UE 100 and the SN.

The RRC message from the UE 100 to the base station 200A is transmitted in the RRC container transmitted on the SRB 3 to the base station 200B, and thereafter, transferred from the base station 200B to the base station 200A via the inter-base station interface.

The RRC container transmitted on such an SRB 3 may be a dedicated RRC container that can be used only in a case where the operation according to the first embodiment (i.e., the MCG connection via the SCG link) is active.

The state in step S107 may be considered as a state in which the UE 100 has an RRC connection with each of the base station 200A and the base station 200B. In this case, the RRC connection established between the UE 100 and the base station 200A may be suspended or deactivated. The UE 100 may be in the RRC inactive mode. Since the link state with the MCG is poor, the UE 100 can detect an RLF when the UE 100 maintains the RRC connected mode. Thus, the RRC connection between the UE 100 and the base station 200A may be suspended.

Note that the RRC of the UE 100 connected to the MCG may be a master RRC (M-RRC) and the RRC of the UE 100 connected to the SCG may be a secondary RRC (S-RRC). The M-RRC of the UE 100 may give an indication to select a cell to which the S-RRC of the UE 100 is to be connected. Here, the M-RRC of the UE 100 may configure for the S-RRC a list of candidate cells to which the S-RRC is to be connected. Because it is difficult to perform control in a case where the S-RRC may be connected to any cell, the M-RRC of the UE 100 specifies a cell to which the S-RRC of the UE 100 is to be connected. For example, in order to obtain a diversity gain, it is possible to separately control the frequencies of the cells to which the M-RRC and the S-RRC are to be connected, or cause the S-RRC to select a cell different from the cell to which the M-RRC is connected.

The UE 100 may transmit the measurement report in the RRC container to the base station 200A via the base station 200B. The measurement report includes measurement results obtained by measuring the radio state of each cell by the UE 100. In response to determining, based on a measurement report from the UE 100, for example, that the radio state between the UE 100 and the base station 200A is improved (step S108), the base station 200A may use the RRC container to transmit control information for recovering the DC connection (the RRC connection between the UE 100 and the base station 200), to the UE 100 via the base station 200B. The control information includes a contention-free random access preamble used for the random access procedure to the base station 200A, and/or a radio configuration used for radio communication with the base station 200A, and the like.

In a case where it is determined that the radio state between the UE 100 and the base station 200A has improved (step S108), for example, the UE 100 may transmit a message (e.g., an RRC Re-Request message) for re-requesting the RRC connection, to the base station 200A via the base station 200B. The base station 200A may transmit a response message for the message to the UE 100 via the base station 200B. The response message may include information indicating that DC is to be recovered based on the previous DC configuration information.

In step S108, the UE 100 and the base station 200A recover the MCG link. Here, the UE 100 may transmit a notification that the MCG link has improved, in the RRC container to the base station 200A via the base station 200B. The base station 200A may transmit a response for the notification from the UE 100 directly to the UE 100 by way of, for example, the RRC Reconfiguration message via the MCG link. Alternatively, the base station 200A may transmit the response for the notification from the UE 100, in the RRC container to the UE 100 via the base station 200B.

On the other hand, in a case where the radio state of the MCG link does not improve even if a certain period of time elapses (i.e., in a case where the MCG link cannot be re-established), the base station 200A may hand over the UE 100 to the base station 200B to hand off the RRC connection to the base station 200B. In this case, DC ends, and the UE 100 communicates only with the base station 200B.

The certain period of time described above may be configured by a timer. The base station 200A may configure a timer for the base station 200B. The base station 200B may start the timer upon reception of the first message from the UE 100 (step S103). The base station 200B may configure (notify) a timer for the base station 200A. The base station 200A may start the timer upon reception of the second message from the base station 200B (step S104) or upon transmission of a positive acknowledgment (Ack) (step S105). The base station 200A may configure a timer for the UE 100. The UE 100 may start the timer upon detection of degradation of the MCG link. In a case where the timer expires without recovery of the MCG link, the UE 100 may automatically perform a handover to the base station 200B without receiving a handover indication from the base station 200A.

According to the first embodiment, in a case where degradation of the MCG link is detected after the DC communication is initiated, the RRC message is transmitted and/or received between the UE 100 and the base station 200A via the base station 200B while maintaining the RRC connection between the UE 100 and the base station 200A. This allows the base station 200A to perform various types of control on the UE 100 via the SCG even in a case where an RLF of the MCG link occurs. Therefore, the DC communication can be quickly recovered in a case where the radio state of the MCG improves.

Modified Example of First Embodiment

The first embodiment described above assumes that in response to detecting an RLF with the base station 200A functioning as the MN or a sign of the RLF, the UE 100 reselects, on a priority basis, the base station 200B (SCG) functioning as the SN. Then, in an example described above in the first embodiment, the UE 100 transmits the RRC Re-establishment Request message (first message) for requesting re-establishment of the RRC connection, to the base station 200B (SCG).

Generally, in response to detecting an RLF, the UE 100 performs a cell re-selection operation within a certain period of time to select an appropriate cell and transmits the RRC Re-establishment Request message. Such a cell re-selection operation includes measurement of radio quality (RSRP, RSRQ, etc.) for each cell and evaluation of whether the measurement results meet cell selection criteria.

However, when the base station 200B functions as the SN, such a cell re-selection operation is unnecessary. Thus, in response to detecting an RLF with the base station 200A acting as the MN or a sign of the RLF, the UE 100 may omit the cell re-selection operation and transmit the RRC Re-establishment Request message to the base station 200B.

However, in response to detecting an RLF with the base station 200A acting as the MN or a sign of the RLF, the UE 100 may perform the cell re-selection operation in a case where an SCG RLF (or a radio problem with the SCG) of the radio link with the base station 200B is occurring. On the other hand, with no occurrence of an SCG RLF (or the radio problem with the SCG) with the base station 200B, the UE 100 may omit the cell re-selection operation. Note that, in a case that the cell of the base station other than the base stations 200A and 200B is reselected through the cell re-selection operation, the DC is terminated.

In a case where permission to perform an operation for omitting the cell selection operation as described above is configured by the base station 200A or 200B, the UE 100 may perform the omission operation.

Second Embodiment

Next, operations of a mobile communication system according to a second embodiment will be described focusing on differences from the first embodiment.

In the second embodiment, an example will be described in which, in a case where degradation in the MCG link is detected after the DC communication is initiated, the roles of the MN and the SN are switched between the base station 200A and the base station 200B (hereinafter, appropriately referred to as "Role Change") so that the DC communication can be quickly recovered.

Figure 8:
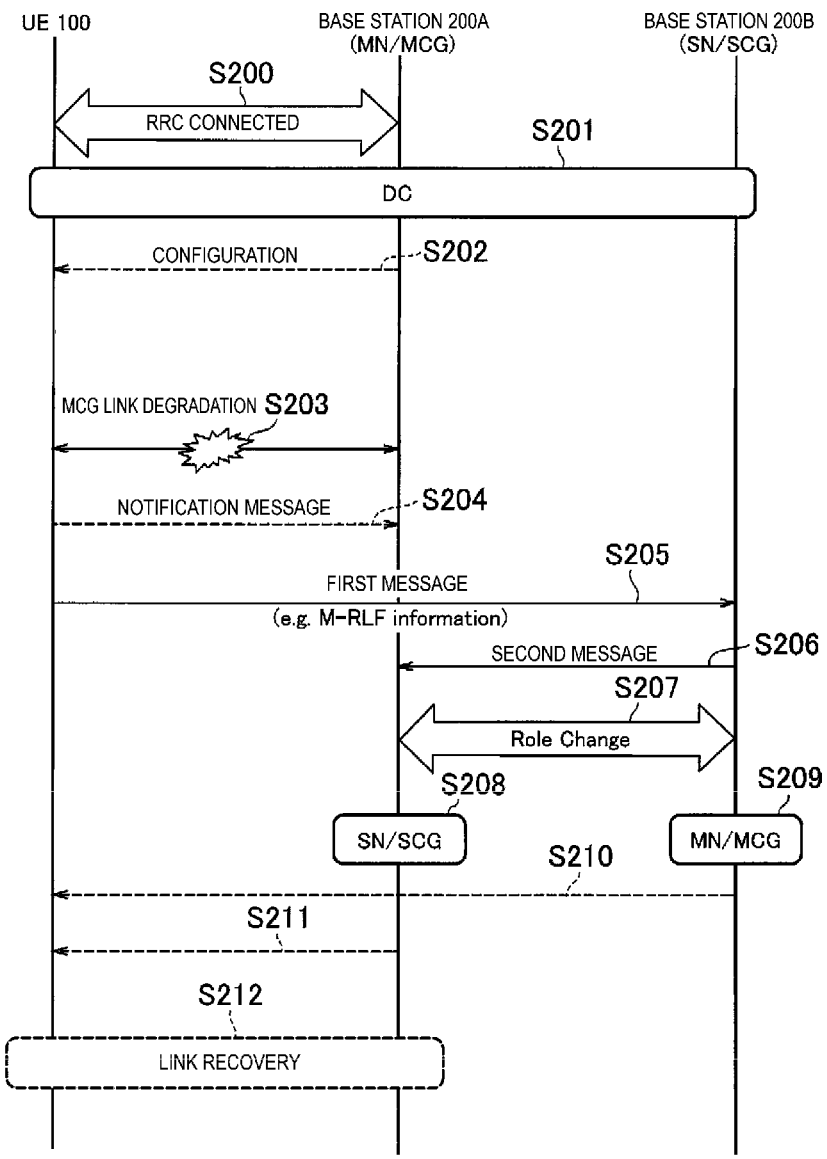
FIG. 8 is a diagram illustrating operations of a mobile communication system according to a second embodiment.

FIG. 8 is a diagram illustrating operations of the mobile communication system according to the second embodiment.

As illustrated in FIG. 8, in step S200, the UE 100 establishes an RRC connection with the base station 200A and is in the RRC connected mode.

In step S201, the UE 100 initiates the DC communication with the base station 200A and the base station 200B.

Here, the base station 200A may transmit to the base station 200B an Addition Request for requesting the addition of the base station 200B for DC. The base station 200B may transmit a positive acknowledgment (Addition Request Ack) for the Addition Request to the base station 200A in response to receiving the Addition Request.

The base station 200A may transmit an RRC message including DC configuration information to the UE 100 in response to receiving a positive acknowledgment (Addition Request Ack) (step S202).

As a result, the base station 200A functions as the MN, and the base station 200B functions as the SN. At least one cell of the base station 200A is configured as an MCG for the UE 100, and at least one cell of the base station 200B is configured as an SCG for the UE 100.

In step S202, the base station 200A may configure a threshold value for detecting degradation of the MCG link for the UE 100. The threshold value may be different from a threshold value for defining a triggering condition for a measurement report. The threshold value may be a threshold value concerning a radio state for detecting a sign of an RLF. For example, the base station 200A configures the number of times N as a threshold value for the UE 100 under the assumption that an RLF is to be detected when the number of RLC retransmissions reaches M (M>N). This allows the UE 100 to detect a likelihood of an RLF at an early stage before an RLF with the MCG occurs.

In step S202, the base station 200A may transmit configuration information to be used after the Role Change to the UE 100 in advance. Specifically, the base station 200A transmits a plurality of RRC configurations to the UE 100. A first RRC configuration of these RRC configurations is configuration information to be used immediately for the MCG link and is active when configured for the UE 100. At least one second RRC configuration of these RRC configurations is configuration information to be used after the Role Change, and is in a standby state (inactive) when configured for the UE 100.

The base station 200A may include the plurality of RRC configurations in one RRC Reconfiguration message to transmit collectively the plurality of RRC configurations to the UE 100. Alternatively, the base station 200A may transmit the first RRC configuration to the UE 100 in advance, and then additionally transmit the second RRC configuration to the UE 100. The base station 200A may specify and delete any of the plurality of RRC configurations for the UE 100. Each of the plurality of RRC configurations may be associated with the cell identifier. The base station 200A may transmit a plurality of sets of RRC configuration and cell identifier to the UE 100. For example, the UE 100 uses different RRC configurations by activating the corresponding RRC configuration for each cell in the MCG.

In step S203, the UE 100 detects degradation in the MCG link.

As described above, degradation in the MCG link refers to an occurrence of an RLF or a sign of the RLF. For example, the UE 100 detects an RLF in a case where a radio problem (e.g., out-of-synchronization) occurs in the physical layer and no recovery is made within a certain period of time, or in a case where a random access procedure failure or an RLC layer failure occurs.

A sign of an RLF means that the detection threshold value of an RLF is not met, but a failure below the detection threshold value of an RLF has occurred. For example, a sign of an RLF corresponds to a prescribed number of times of occurrence of the out-of-synchronization within a certain period of time in the MCG link, or a prescribed number of times of retransmission of a random access preamble in the random access procedure. These prescribed number of times may be configured as threshold values from the base station 200A.

Note that, in a case where an RLF or a sign of the RLF between the base station 200A and the UE 100 occurs, it is conceivable that the UE 100 can detect the RLF or the sign of the RLF, but the base station 200A is not capable of detecting the RLF or the sign of the RLF.

In step S204, the UE 100 detecting a sign of an RLF may transmit a message notifying a likelihood of an RLF to the base station 200A. The message may be a message different from the measurement report or may be a request message requesting a Role Change. The UE 100 may transmit the message to the base station 200A by using the SRB (SRB 1) that is associated with a MAC entity for the MCG. The base station 200A may perform the Role Change (step S207), based on receiving the message notifying a likelihood of an RLF.

In step S205, the UE 100 transmits the first message based on degradation in the MCG link to the base station 200B functioning as the SN. The UE 100 detecting a sign of an RLF may transmit the message to the base station 200A in step S204, and may transmit the first message to the base station 200B in step S205.

The first message may be a message indicating that the UE 100 has detected an RLF with the base station 200A (MCG link) or a sign of the RLF. Such a message may be referred to as an M-RLF information message. The first message may be a measurement report message. The UE 100 transmits the M-RLF information message or the measurement report message to the base station 200B by using the SRB (SRB 3) that is associated with a MAC entity for the SCG.

The first message may include at least one of an information element indicating a type of failure (any of T310 expiration, random access failure, and RLC retransmission upper limit arrival) and an information element indicating a measurement result of the radio state.

In step S206, the base station 200B transmits the second message to the base station 200A, based on the first message received from the UE 100.

The second message may be a notification message indicating that an RLF on the MCG link or a sign of the RLF has been detected, or may be a request message for the base station 200B to serve as the MN.

The second message may include at least one of a PDCP Change Indication which is an information element indicating whether or not PDCP data recovery is necessary, and a container for carrying the RRC information element.

In step S207, the base station 200A and the base station 200B perform the Role Change.

In a case where the second message is the request message (Role Change request message) for the base station 200B to serve as the MN, the base station 200A, in step S207, may transmit a response message (Ack or Nack) for this Role Change request message to the base station 200B.

Alternatively, in step S207, the base station 200A may transmit the Role Change request message to the base station 200B, based on the message received from the UE 100 in step S204 or the second message received from the base station 200B in step S206. The Role Change request message may include various configuration information required for the base station 200B to serve as the MN. The base station 200B that received the Role Change request message may transmit a response message (Ack or Nack) for the Role Change request message to the base station 200A.

As a result, the base station 200A is changed to the SN (step S208), and the base station 200B is changed to the MN (step S209).

At least one of the base station 200A and the base station 200B may transmit a message indicating that the Role Change has been performed to the UE 100 (step S210, step S211). The message indicating that the Role Change has been performed may include at least one of a cell identifier of each cell included in the new MCG and a cell identifier of each cell included in the SCG.

The UE 100 confirms that the Role Change has been performed based on the message received in step S210 and/or step S211.

After confirming that the Role Change has been performed, the UE 100 that has received in step S202 the plurality of RRC configurations (the first RRC configuration and the second RRC configuration) from the base station 200A activates the second RRC configuration having been standing by. Subsequently, the UE 100 initiates application of the second RRC configuration. In a case where a plurality of second RRC configurations are present and are linked with the cell identifiers, the UE 100 activates those of the plurality of second RRC configurations which are linked with the cell identifiers of the cells newly formed into an MCG. Subsequently, the UE 100 may discard the other second RRC configurations or hold the other second RRC configurations in the standby state. Whether to discard or hold the other second RRC configurations may be determined by a configuration from the base station 200A (step S202).

Note that the UE 100 may activate the second RRC configuration that has been in standby, being triggered under a condition different from receiving the message in step S210 and/or step S211. For example, the UE 100 may activate the second RRC configuration that has been in standby, being triggered by transmitting the message in step S204 or transmitting the message in step S205.

In a case where the state of the radio state of the base station 200A functioning as the SN improves (step S212), the UE 100 can transmit and/or receive data to and from the base station 200A. On the other hand, in a case where the radio state of the base station 200A does not improve even if a certain period of time elapses, the base station 200B functioning as the MN transmits a release message to the base station 200A. Thus, the base station 200B may release the base station 200A functioning as the SN. In this case, DC ends, and the UE 100 communicates only with the base station 200B. The method for configuring the certain period of time is the same as in the first embodiment.

According to the second embodiment, in a case where degradation of the link of the base station 200A is detected after the DC communication is initiated, the roles of the MN and the SN are switched between the base station 200A and the base station 200B. As a result, the base station 200B newly serving as the MN can control the UE 100 while the base station 200A is maintained as the SN. Thus, the DC communication can be quickly recovered in a case where the radio state of the base station 200A is improved.

Modified Example 1 of First and Second Embodiments

The first and second embodiments described above assume a case of the UE 100 that the out-of-synchronization has occurred in the MCG link a prescribed number of times within a certain period of time or that a random access preamble has been retransmitted a prescribed number of times during the random access procedure. The example has been described in the first and second embodiments in which a sign of an RLF of the MCG link is detected, and the first message notifying the sign of the RLF of the MCG link is transmitted to the base station 200B, in the above-described case. In the present modified example, a specific example of such an operation will be described.

Figure 9A:
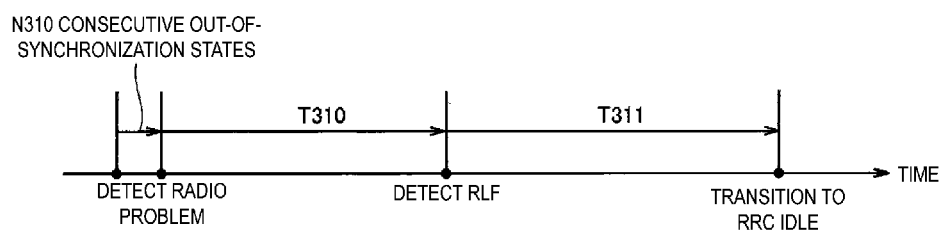
FIG. 9A illustrates general operations of a user equipment associated with an RLF.

First, general operations of the UE 100 associated with an RLF will be described. As illustrated in FIG. 9A, the UE 100 detects a radio problem in a case where an out-of-synchronization state (out-of-sync) is detected N310 consecutive times. The UE 100 starts a prescribed timer T310 in response to detecting a radio problem. The UE 100 stops the timer T310 in response to detecting an in-synchronization state (in-sync) N311 consecutive times after the timer T310 is started. In response to expiry of the timer T310, the UE 100 detects an RLF and starts a timer T311, and initiates the cell re-selection operation (connection re-establishment processing). Then, in response to expiry of the timer T311 with unsuccessful connection re-establishment, the UE 100 transitions to an RRC idle mode.

Figure 9B:
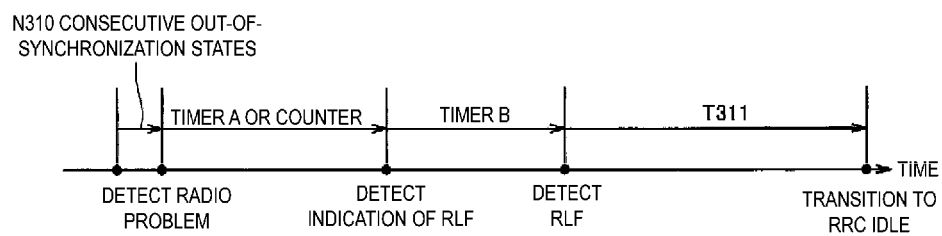
FIG. 9B is a diagram illustrating operations of a UE according to Modified Example 1 of the first and second embodiments.

Now, operations according to the present modified example will be described. As illustrated in FIG. 9B, the UE 100 detects a radio problem in response to detecting the out-of-synchronization state (out-of-sync) N310 consecutive times. The UE 100 starts a timer A or a counter for detecting a sign of an RLF in response to detecting the radio problem. The value of the timer A is smaller than the value of the timer T310.

In a case where the timer A is used, then in response to expiry of the timer A, the UE 100 detects a sign of an MCG RLF and transmits the first message described above to the base station 200B.

In a case where the counter is used, the UE 100 increments the counter each time a radio problem is detected, and in response to a counter value reaching a threshold value, the UE 100 detects a sign of an MCG RLF and transmits the first message described above to the base station 200B. The UE 100 detects a radio problem once in response to detecting the out-of-synchronization state (out-of-sync) N310 consecutive times. Then, the UE 100 detects the in-synchronization state (in-sync) N311 consecutive times (the timer T310 stops), and subsequently, in response to detecting the out-of-synchronization state (out-of-sync) N310 consecutive times, detects a radio problem once again. In this way, the counter value is incremented. The UE 100 may reset the counter value in a case where no radio problem occurs for a certain period of time. A threshold value for the counter value may be appropriately configured.

Alternatively, the counter may be a counter that counts occurrences of the out-of-synchronization state (out-of-sync). The threshold value of the counter may be greater than or less than the value of N310. The UE 100 may reset the counter value in response to detecting the in-synchronization state (in-sync). It is assumed that Tout is the period at which the UE 100 detects the out-of-synchronization state (out-of-sync) and that Tin is the period at which the UE 100 detects the in-synchronization state (in-sync) and that each of Tout and Tin is a certain amount of time. In this case, a counter threshold value Nout for the above-described counter that counts occurrences of the out-of-synchronization state (out-of-sync) may be configured to satisfy Nout×Tout<N311×Tin. Satisfying this expression allows the UE 100 to detect a sign of an RLF before the in-synchronization state (in-sync) is detected N311 times, i.e., before expiry of the timer T310. The UE 100 may initiate counting of occurrences of the out-of-synchronization state (out-of-sync) at the timing when the first of the N310 occurrences of the out-of-synchronization state (out-of-sync) is detected, the N310 occurrences of the out-of-synchronization states corresponding to the condition for detecting a radio problem in FIGS. 9A and 9B.

Note that the value (threshold value) of the timer A and the threshold value of the counter may be configured for the UE 100 by the base station 200A or 200B. The value of the period of time in which no radio problem occurs (the "certain period of time") may be configured for the UE 100 by the base station 200A or 200B. The UE 100 may combine the timer A and the counter to detect a sign of an MCG RLF.

In response to detecting a sign of an RLF and transmitting the first message described above to the base station 200B, the UE 100 starts the timer B. The UE 100 suspends the initiation of the RLF detection or connection re-establishment processing (RRC Reestablishment procedure) during operation of the timer B. In response to transmission of the first message from the UE 100 to the base station 200B, operations such as those in the first and second embodiments described above are performed on the network (base stations 200A and 200B) side. As a result, an indication may be transmitted from the network to the UE 100. By suspending the initiation of the RLF detection or connection re-establishment processing during operation of the timer B, the UE 100 can wait for an indication from the network side.

The UE 100 may stop the timer B in response to receiving an indication from the network side during operation of the timer B. While the timer B is in operation, the UE 100 does not detect an RLF or perform the connection re-establishment processing even in a case where the timer T310 expires.

The UE 100 performs the suspended operation when the timer B expires. In other words, the UE 100 detects an RLF and initiates the connection re-establishment processing.

Note that the value (threshold value) of the timer B may be configured for the UE 100 by the base station 200A or 200B.

In the present modified example, an example has been described in which the timer B is a timer that operates in parallel with the timer T310. However, the need for the timer B may be eliminated by partially changing handling of the timer T310 and resetting (restarting) the timer T310 in response to detection of a sign of an RLF, followed by transmission of the first message.

Modified Example 2 of First and Second Embodiments

In the above-described embodiments, the example has been described in which, in response to detecting degradation of the MCG link (i.e., an RLF or a sign of the RLF), the UE 100 starts the timer, and waits for improvement (recovery) of the radio state of the MCG link until the timer expires.

In this regard, the base station 200A used as the MN desirably recognizes whether the timer is in operation in the UE 100 because an indication (e.g., a handover indication) can be provided to the UE 100 while the timer is in operation. However, the base station 200A has difficulty in recognizing when the UE 100 starts the timer.

Figure 10:
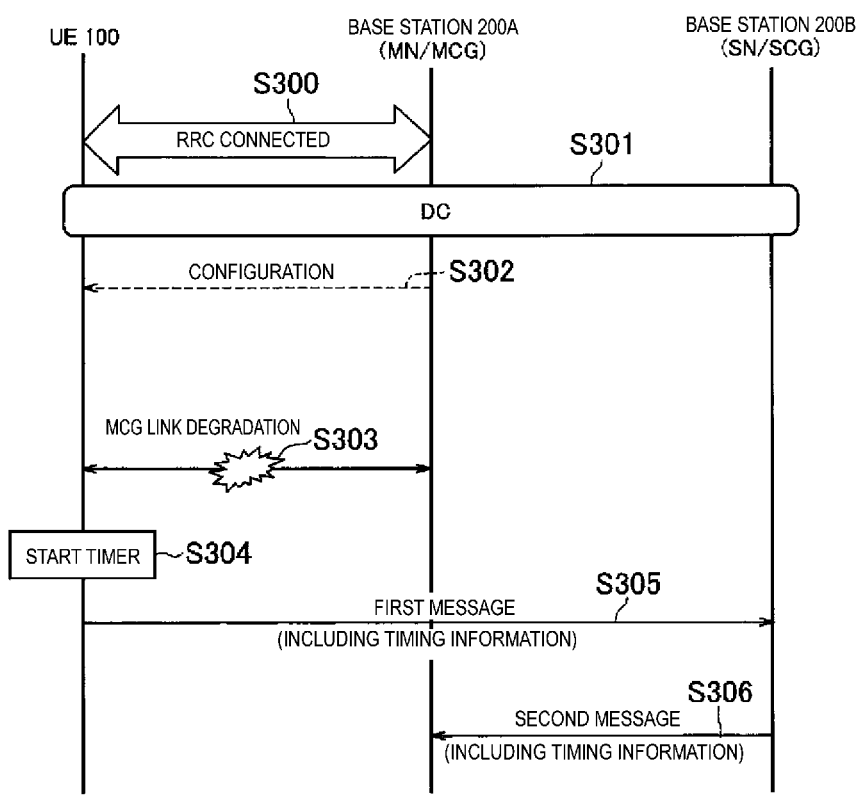
FIG. 10 is a diagram illustrating operations of a mobile communication system according to Modified Example 2 of the first and second embodiments.

FIG. 10 is a diagram illustrating operations of a mobile communication system according to the present modified example. The operations according to the present modified example relate to a method for controlling the DC communication in which the UE 100 simultaneously communicates with the base station 200A (MN) and the base station 200B (SN).

As illustrated in FIG. 10, steps S300 to S303 are similar to steps S100 to S102 in the first embodiment.

However, in step S302, the base station 200A may configure, for the UE 100, a timer value specifying the amount of time to wait for an indication from the base station 200A after detecting degradation of the radio link between the base stations 200A and UE 100. The timer value may be configured for each UE by the RRC Reconfiguration message or may be broadcast by SIBs. Additionally, the base station 200A may provide, for the UE 100, a configuration indicating permission to transmit the first message.

In response to detecting degradation of the MCG link in step S303, the UE 100 starts, in step S304, a timer that specifies the amount of time to wait for an indication from the base station 200A. The value of the timer may be configured by the base station 200A in step S302, or may be a preset value specified in specifications. The start timing of the timer may be a timing at which degradation of the MCG link is detected or may be a transmission timing for the first message.

In step S305, the UE 100 transmits, to the base station 200B, the first message indicating the degradation of the radio link. The first message may be the same as the first message described above in the first embodiment, and is, for example, a message indicating an RLF with the base station 200A (MCG link) or a sign of the RLF. Such a message may be referred to as an MCG failure indication message.

In the present modified example, the UE 100 includes, in the first message, timing information indicating the start timing for the timer in step S304. The timing information may be represented by a system frame number (SFN) of the base station 200A corresponding to the start timing for the timer. The timing information may be represented by an absolute time corresponding to the start timing for the timer. This absolute time may be obtained by a global navigation satellite system (GNSS) of the UE 100.

The base station 200B used as the SN receives the first message from the UE 100. In step S306, the base station 200B transmits, to the base station 200A, the second message corresponding to the first message from the UE 100. The second message may be the same as the second message described in the above-described embodiments, and may be, for example, a transfer message including, as a container, the contents of the first message received from the UE 100 by the base station 200B. In other words, the timing information included in the first message by the UE 100 is transferred from the base station 200B to the base station 200A.

In response to receiving the second message from the base station 200B, the base station 200A determines the period of time in which the UE 100 remains in the base station 200A (i.e., the period of time until the timer expires), based on the timing information included in the second message received. The base station 200A determines that an indication to the UE 100 can be transmitted within this period of time.

The base station 200A may determine that no indication can be transmitted to the UE 100 outside the period of time, and may determine not to transmit the indication message. Furthermore, the base station 200A may consider that the UE 100 has detected an MCG RLF and may discard the UE context of the UE 100. Note that the UE context may be discarded when the timer expires or after a certain period of time has elapsed since the expiry of the timer. The certain period of time may correspond to, for example, a timing when a determination can be made that a UE context acquisition request from another base station is not performed. Specifically, the timing may be when the timer (T311) for determining failure in RRC Reestablishment expires, causing the UE 100 to transition to the idle mode.

Subsequent operations are similar to the corresponding operations in the embodiments described above.

As described above, according to the present modified example, the base station 200A can recognize the timer start timing in the UE 100. In particular, even in a case where a delay occurs after the UE 100 starts the timer and before the first message is transmitted to the base station 200B and/or a delay occurs after the base station 200B receives the first message and before the base station 200A receives the second message, the base station 200A can accurately recognize the timer start timing in the UE 100.

Note that in a case where the delay after the UE 100 starts the timer and before the first message is transmitted to the base station 200B is negligible, then instead of the UE 100 including the timing information in the first message, the base station 200B may include the timing information in the second message. Specifically, the base station 200B considers, as the timer start timing in the UE 100, the timing when the first message is received from the UE 100, and includes information indicating the timing when the first message is received from the UE 100, in the second message as timing information.

Modified Example 3 of First and Second Embodiments

In the embodiments described above, an example has been described in which, in response to recovery of the MCG link, the degradation (i.e., an RLF or a sign of the RLF) of which has been detected by the UE 100, a notification that the MCG link has been improved (recovered) is transmitted from the UE 100 to the base station 200A via the base station 200B. In the present modified example, details of such operations will be described.

Figure 11:
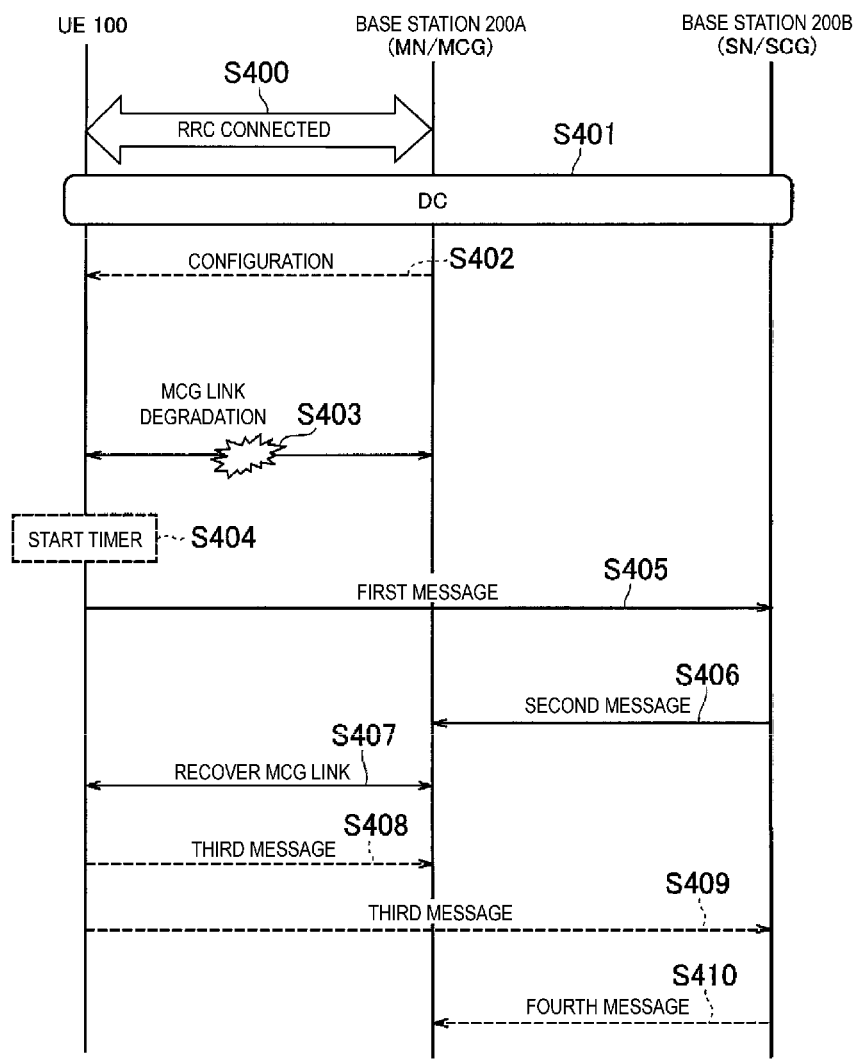
FIG. 11 is a diagram illustrating operations of a mobile communication system according to Modified Example 3 of the first and second embodiments.

FIG. 11 is a diagram illustrating operations of the mobile communication system according to the present modified example. The operations according to the present modified example relate to a method for controlling the DC communication in which the UE 100 simultaneously communicates with the base station 200A (MN) and the base station 200B (SN).

As illustrated in FIG. 11, steps S400 to S406 are similar to those in Modified Example 2 described above. However, the timer described in Modified Example 2 described above is not required in the present modified example.

In step S407, the UE 100 detects recovery of the radio link (MCG link) with the base station 200A. Specifically, the UE 100 detects recovery of the radio state of the MCG link as described below. For example, the UE 100 detects recovery of the radio state of the MCG link in a case where the received power or the reception quality of a reference signal received from the MCG exceeds a threshold value or where the state in which the received power or the reception quality exceeds the threshold value lasts for a certain period of time. Alternatively, the UE 100 may detect recovery of the radio state of the MCG link in a case where the number of times the in-synchronization state (in-sync) has been consecutively detected for the MCG link exceeds a threshold value. These threshold values may be configured for the UE 100 by the base station 200A (e.g., configured in step S402).

In step S408, the UE 100 transmits, to the base station 200A, a third message indicating that the MCG link has been improved (recovered). The third message as described above may be referred to as an MCG Recovered Indication message.

Alternatively, in step S409, the UE 100 may transmit, to the base station 200B, the third message indicating that the MCG link has been improved (recovered). In this case, the base station 200B may transmit, to the base station 200A, a fourth message corresponding to the third message from the UE 100 (step S410). The fourth message may be a transfer message including, as a container, the contents of the third message received from the UE 100 by the base station 200B.

The UE 100 may transmit the third message indicating recovery of the radio link in response to detecting recovery of the radio link within a prescribed amount of time after transmitting the first message indicating the degradation of the radio link. In other words, one condition under which the third message can be transmitted may state that the third message is transmitted within the prescribed amount of time after the transmission of the first message.

Additionally, one condition under which the third message can be transmitted may state that the permission to transmit the first message has been configured by the base station 200A. Furthermore, one condition under which the third message can be transmitted may state that the permission to transmit the third message has been configured by the base station 200A. As one condition under which the third message can be transmitted may state that the timer described above in Modified Example 2 is in operation.

Based on the third message received from the UE 100 in step S408 or the fourth message received from the base station 200B in step S410, the base station 200A recognizes that the MCG link has been improved (recovered) and resumes radio communication with the UE 100.

Modified Example 4 of First and Second Embodiments

The present modified example relates to an operation for making an addition or change to the base station 200B. The addition to the base station 200B refers to addition of the base station 200B as the SN to initiate the DC communication when the base station 200A is connected with the UE 100. The addition to the base station 200B may be referred to as SCG Addition. The change to the base station 200B refers to a change, from another base station to the base station 200B, of the SN of the UE 100 having already initiated the DC communication. The change to the base station 200B may be referred to as SCG Change.

Figure 12:
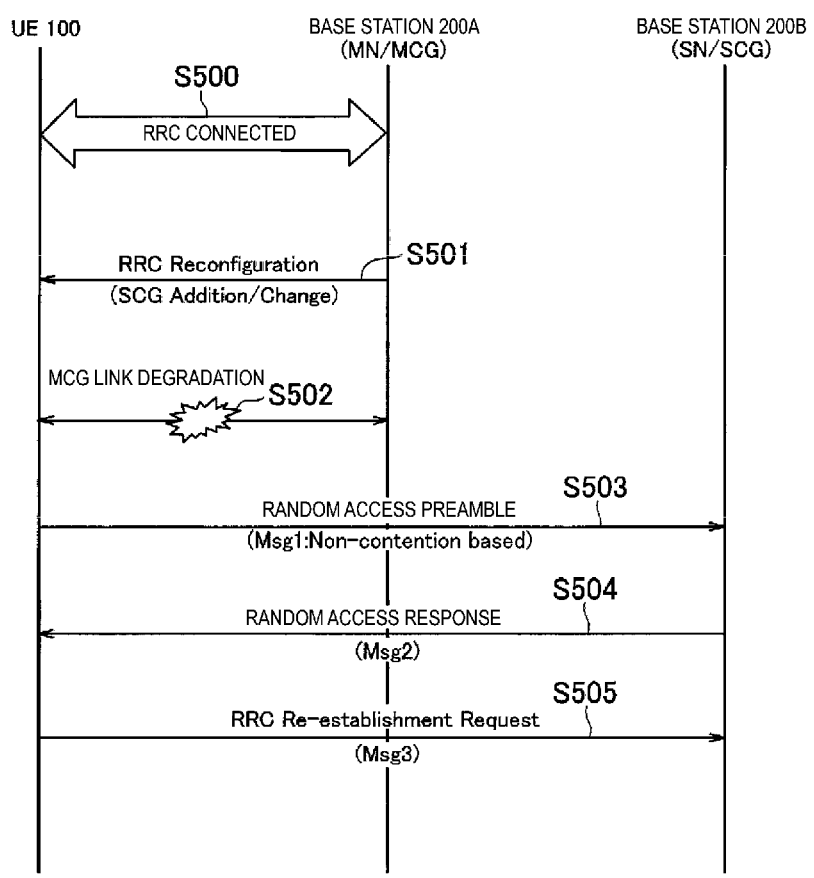
FIG. 12 is a diagram illustrating operations of a mobile communication system according to Modified Example 4 of the first and second embodiments.

FIG. 12 is a diagram illustrating operations of the mobile communication system according to the present modified example. The operations according to the present modified example relate to a method for controlling the DC communication in which the UE 100 simultaneously communicates with the base station 200A (MN) and the base station 200B (SN).

As illustrated in FIG. 12, in step S500, the UE 100 establishes an RRC connection with the base station 200A and is in the RRC connected mode.

In step S501, the base station 200A transmits the RRC Reconfiguration message to the UE 100 for making addition or change to the base station 200B. The RRC Reconfiguration message includes information configuring a non-contention based physical random access channel (PRACH) resource. The non-contention based PRACH resource is a PRACH resource reserved in the base station 200B to make addition or change to the base station 200B. After receiving the RRC Reconfiguration message, the UE 100 initiates a random access procedure for connecting to the base station 200B.

In step S502, before connecting to the base station 200B, the UE 100 detects degradation of the radio link between the base station 200A and the UE 100 (MCG failure).

In step S503, the UE 100 initiates RRC re-establishment processing for the base station 200B in response to detecting the degradation of the radio link between the base stations 200A and the UE 100, and transmits the random access preamble (Msg1) to the base station 200B. In this regard, the UE 100 transmits the random access preamble to the base station 200B by using the non-contention based PRACH resource configured by the RRC Reconfiguration message.

In step S504, the base station 200B transmits a random access response (Msg2) to the UE 100 in response to receiving the random access preamble from the UE 100.

In step S505, the UE 100 transmits an RRC Re-establishment Request message to the base station 200B. The RRC re-establishment request message corresponds to Msg3.

In accordance with the present modified example, in response to detecting an MCG failure after receiving the RRC Reconfiguration message for making addition or change to the base station 200B, the UE 100 transmits a random access preamble to the base station 200B by using the non-contention based PRACH resource. This allows the UE 100 and base station 200B to more reliably complete the RRC re-establishment processing.

Other Embodiments

In the first and second embodiments described above and the modified examples of the embodiments, the UE 100 may transmit the above-described first message by using a Split SRB1. The Split SRB1 is a signaling radio bearer that branches at the base station 200A, with the base station 200B being interposed between the base stations 200A and the UE 100. Alternatively, the UE 100 may transmit the above-described first message by using an SRB3. In this case, the base station 200B functioning as the SN may be responsible for controlling the UE 100, or may follow an indication from the MN (base station 200A) via the Xn interface.

In the above-described first and second embodiments and the modified examples of the embodiments, the base station 200A or 200B receiving the above-described first message may transmit a handover indication to the UE 100. The handover indication may be an indication for conditional handover.

At least some of the operations according to the first embodiment and at least some of the operations according to the second embodiment may be performed in combination.

As another embodiment, at least some of the operations according to the first embodiment and at least some of the operations according to the second embodiment may be applied to carrier aggregation (CA). In the case of application to CA, the MN and the MCG are interpreted as primary cells (PCell), and the SN and the SCG are interpreted as secondary cells (SCell).

As another embodiment, the UE 100 may perform the DC communication with the base station and another UE. Specifically, the UE 100 performs simultaneous communication with the base station and another UE via a Uu interface with the base station and a PC5 interface (sidelink) with the other UE, respectively. Under such an assumption, the above-described M-RRC may be an RRC for the base station (Uu), and the above-described S-RRC may be an RRC for another UE (PC5).

A program causing a computer to execute each of the processes performed by the UE 100 or the gNB 200 may be provided. The program may be recorded on a computer readable medium. The program can be installed in a computer by using the computer readable medium Here, the computer readable medium on which the program is recorded may be a non-transitory recording medium. Although the non-transitory recording medium is not limited to a particular one, a recording medium, for example, a CD-ROM, a DVD-ROM, or the like may be adopted.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A communication control method for controlling predetermined communication in which a wireless communication node communicates with a first node and a second node, the communication control method comprising:

detecting, by the wireless communication node, degradation of a radio link between the first node and the wireless communication node;

starting, by the wireless communication node, a timer in response to the detecting of the degradation of the radio link;

transmitting, by the wireless communication node, an indication of the degradation of the radio link, to the second node in response to the detecting of the degradation of the radio link; and transmitting an indication of recovery of the radio link in response to detecting recovery of the radio link within a predetermined amount of time after transmitting the indication of the degradation of the radio link.

2. The communication control method according to claim 1, comprising receiving, by the wireless communication node, an RRC message from the first node, from the second node via a signaling bearer (SRB3) established between the second node and the wireless communication node.

3. The communication control method according to claim 1, comprising stopping, by the wireless communication node, transmission of an uplink signal to the first node in a case of detecting the degradation of the radio link.

4. The communication control method according to claim 1, comprising measuring, by the wireless communication node, a radio state for the first node even in a case of detecting the degradation of the radio link.

5. The communication control method according to claim 1, wherein the indication of the degradation of the radio link includes at least one of a measurement report of a radio state of the first node or an information element indicating a type of the degradation of the radio link.

6. A wireless communication node in predetermined communication in which the wireless communication node communicates with a first node and a second node, the wireless communication node comprising a processor and a memory, the processor configured to detect degradation of a radio link between the first node and the wireless communication node, start a timer in response to the detecting of the degradation of the radio link, transmit an indication of the degradation of the radio link, to the second node in response to the detecting of the degradation of the radio link, and transmit an indication of recovery of the radio link in response to detecting recovery of the radio link within a predetermined amount of time after transmitting the indication of the degradation of the radio link.

7. An apparatus for controlling a wireless communication node in predetermined communication in which the wireless communication node communicates simultaneously with a first node and a second node, the wireless communication node comprising a processor and a memory, the processor configured to detect degradation of a radio link between the first node and the wireless communication node, start a timer in response to the detecting of the degradation of the radio link, transmit an indication of the degradation of the radio link, to the second node in response to the detecting of the degradation of the radio link, and transmit an indication of recovery of the radio link in response to detecting recovery of the radio link within a predetermined amount of time after transmitting the indication of the degradation of the radio link.

\* \* \* \* \*